United States Patent Office 3,435,117
Patented Mar. 25, 1969

3,435,117
COLLAGEN FIBRIL MATRIX PHARMACEUTICALS
Joseph Nichols, Princeton, N.J., assignor to Ethicon, Inc., a corporation of New Jersey
No Drawing. Filed Mar. 9, 1966, Ser. No. 532,892
Int. Cl. A61k 21/00, 27/00
U.S. Cl. 424—271                                9 Claims The present invention relates to aqueous suspensions and oil-in-water emulsions of pharmaceutically active materials, stabilized by the presence in the disperse phase of acid swollen collagen fibrils.

It is common practice in the compounding of pharmaceuticals that are water insoluble to suspend the pharmaceutical in water, thereby producing a colloidal solution wherein the water forms the continuous phase. The present invention has application to both suspensoid and emulsion colloidal dispersions, but is of particular advantage in the stabilization of emulsoid colloids.

In a suspensoid dispersion there is no marked affinity between the disperse phase, which exists as a solid, and the dispersing material. In an emulsoid dispersion, on the other hand, the disperse phase exists as a liquid and there may be a marked affinity between the two phases. Moreover, the individual globules of liquid in the disperse phase have a tendency to merge upon contact, and thus to coalesce into larger particles. This may continue until all of the immiscible liquid has collected into one large mass and forms a separate and distinct layer. Such emulsion is said to have "cracked" and this reaction is irreversible from the standpoint that a proper redistribution of the internal phase may usually not be obtained by shaking.

I have now discovered that such aqueous suspensions and oil-in-water emulsions may be stabilized to obtain improved shelf life by dispersing throughout the continuous aqueous phase, acid swollen collagen fibrils. The reason for the exceptional effectiveness of swollen collagen fibrils as an emulsifying agent for aqueous suspensions and oil-in-water emulsions is not completely understood, but the effect observed appears to be much greater than would be expected from the increase in viscosity contributed thereby.

The acid swollen collagen fibrils that are dispersed throughout the compositions of the present invention have a diameter that varies from about 5,000 to 90,000 angstrom units. Bovine tendon and fresh bovine hides are suitable sources of collagen and these starting materials may be processed to form acid swollen collagen fibrils in accordance with the general procedures described in United States Patents Nos. 3,123,482 and 3,114,593.

The compositions of the present invention have an acid pH and find application in many pharmaceutical preparations wherein acid conditions are optimum to prevent loss of activity in the pharmaceutical ingredient, changes in color, coagulation or precipitation and other undesirable effects. Preferably, the amount of collagen present in said composition will amount to from about 0.2% to about 0.9% by weight (calculated on the basis of dry collagen solids).

The acid employed to swell the collagen may be nontoxic organic acid such as citric, carbonic, or lactic acid, and the amount of the acid present will vary with the equivalent weight of the acid and its ionization constant. In general, however, an acid content of about 0.2% to about 2.0% of the total weight of the solution is used, which results in an aqueous dispersion of swollen collagen fibrils having a pH of about 2.5–4.0.

The invention will appear more clearly from the following detailed description which will show, by way of example, preferred embodiments of the invention idea. Throughout the specification all parts are expressed in parts by weight unless otherwise indicated.

EXAMPLE I

To one hundred parts of a mass of swollen collagen fibrils, prepared as described in Example I of United States Patent No. 3,123,482 is slowly added with stirring 640 parts of a dilute solution of lactic acid in water (1.2% lactic acid). The resulting dispersion of swollen collagen fibrils is homogenized and filtered through a 7-mil filter screen.

EXAMPLE II

A stable suspension of salicylamide is prepared by suspending six parts of salicylamide in one hundred parts of the dispersion of swollen collagen fibrils prepared as described in Example I above. The resulting suspension is homogenized and filtered through a 7-mil screen. The resulting product has analgesic and antipyretic properties, useful for the relief of simple pains and fever in children.

EXAMPLE III

Three parts of gelatin are dissolved in 450 parts of warm water. The gelatin solution is cooled to room temperature and 50 parts of phenoxymethyl penicillin is suspended therein with stirring. The suspension so obtained is added with rapid stirring to 500 parts of the dispersion of swollen collagen fibrils prepared as described in Example I above, and homogenized. The resulting suspension may be kept at room temperature for ten days or in a refrigerator for 20 days without significant loss of potency. This composition is useful in the treatment of bacterial infections caused by organisms susceptible to oral penicillin therapy.

EXAMPLE IV

An oral suspension of methenamine mandelate is prepared by suspending with stirring one part of methenamine mandelate in 9 parts of a dispersion of collagen fibrils prepared as described in Example I above. The product so obtained is homogenized. This composition is a highly effective antibacterial useful in destroying urinary tract pathogens including strains resistant to antibiotics and sulfonamides.

EXAMPLE V

A laxative product is prepared by emulsifying the following composition:

|  | Parts |
|---|---|
| Liquid petrolatum | 500 |
| Agar | 5 |
| Acacia | 20 |
| Phenolphthaline | 4 |
| Ethanol | 60 |
| Vanillin | 0.5 |
| Saccharin | 0.5 |

Collagen dispersion of Example I to make 1000 parts.

EXAMPLE VI

Twenty-four hundred parts of the deep flexor tendon of cattle are sliced and treated with ficin as described in Example VI of United States Patent No. 3,114,593 at column 15, lines 53–71.

A swelling solution is made by adding 755 parts of citric acid to 86,265 parts of water. The drained tendon slices are added to the citric acid swelling solution, cooled to 20° C. and the solution is agitated for 1.5 hours by bubbling air through the mixture. The mixture is then agitated for one hour at 40 r.p.m. while maintaining the aqueous acid solution below 25° C. The suspension of swollen tendon slices is then homogenized by pumping the suspension through a ½-inch tube and through ⅛-inch jets.

The dispersion is next pumped through a 60-mil jet and then forced through a 50-mil jet. Finally, the dispersion is forced through 40-mil jets (two complete passes). The temperature of the dispersion is maintained below 25° C. throughout the homogenization step.

The dispersion so obtained is stored overnight at 25° C. without agitation. The following morning, the dispersion is agitated for ½ hour at 40 r.p.m., and is then passed through a leaf filter containing 15-mil, 9-mil and 5.5-mil screens. During this filtration step, the pressure on the filter does not exceed 40 pounds per square inch.

EXAMPLE VII

A contraceptive vaginal gel is prepared by homogenizing the following composition:

| | Parts |
|---|---|
| Collagen dispersion of Example VI | 90 |
| Ricinoleic acid | 9 |
| Nonylphenoxypolyethoxyethanol | 1 |

EXAMPLE VIII

A nasal decongestant is prepared by homogenizing the following composition:

| | Parts |
|---|---|
| Collagen dispersion of Example III | 13,300 |
| Phenylephrine HCl | 67 |
| Cetyl pyridinium chloride | 4 |
| Decamethylene-bis-(4-aminoquinaldinium acetate) | 2 |

The product so obtained has a prolonged shelf life and provides relief over a period of 4 to 6 hours.

EXAMPLE IX

Three hundred parts of reconstituted collagen tape prepared as described in Example X of U.S. Patent No. 3,114,593 are placed in a perforated metal basket which is placed in a stainless steel kettle. To this is added 151,412 parts of an aqueous solution containing 0.1% sodium chloride, and the tape is dispersed by stirring. The tape is allowed to soak in this solution for a period of 3–4 hours. After this, the liquid is drained and fresh saline solution is added. This process is repeated three times. The tape is then washed three times with 40,000 parts of distilled water for a period of 3–4 hours each washing.

An aqueous saturated solution of carbonic acid at 0–4° C. is then added to the washed and drained tape until the final volume is 34,000 parts by volume. The above carbonic acid solution is prepared by adding Dry Ice to distilled water and stirring until the temperature drops below 4° C.

The tape is then uniformly dispersed by gentle stirring for a few minutes. The container is lightly covered to keep the atmosphere above the liquid saturated with carbon dioxide gas and prevent its excessive loss. The collagen is allowed to swell overnight under these conditions.

After swelling, the resulting mass is thoroughly stirred for half an hour, and then homogenized by repeated passage through a ⅛-inch orifice.

EXAMPLE X

A stable suspension of salicylamide is prepared by suspending 6 parts of salicylamide in 100 parts of a dispersion of swollen collagen fibrils prepared as described in Example IX above. The resulting suspension is homogenized and filtered through a 7-mil screen. The resulting product has analgesic and antipyretic properties useful in the relief of simple pains and fever in children.

EXAMPLE XI

Three parts of gelation are dispersed in 450 parts of warm water, the gelatin solution is cooled to room temperature and 50 parts of phenoxymethyl penicillin is suspended therein with stirring. The suspension so obtained is added with rapid stirring to 500 parts of the dispersion of swollen collagen fibrils prepared as described in Example IX above and homogenized. This composition is useful in the treatment of bacterial infections caused by organisms susceptible to oral penicillin therapy.

EXAMPLE XII

A contraceptive vaginal gel is prepared by homogenizing the following composition:

| | Parts |
|---|---|
| Collagen dispersion of Example IX | 90 |
| Ricinoleic acid | 9 |
| Nonylphenoxypolyethoxyethanol | 1 |

What is claimed is:
1. A stable homogeneous aqueous suspension or oil in water emulsion in oral, nasal, or vaginal gel dosage form having an acid pH and
    (a) consisting essentially of an effective dosage amount of a pharmaceutically active compound and
    (b) at least about 0.2 percent by weight of acid-swollen collagen fibrils dispersed throughout the continuous aqueous phase.
2. The composition of claim 1 wherein the pharmaceutically active compound is a finely divided powder.
3. The composition of claim 1 wherein the pharmaceutically active compound is a water immiscible liquid.
4. The composition of claim 1 having a pH in the range of about 2.0 to about 4.0.
5. The composition of claim 1 in oral dosage form wherein the pharmaceutically active compound is phenoxymethyl penicillin.
6. The composition of claim 1 in oral dosage form wherein the pharmaceutically active compound is methenamine mandelate.
7. The composition of claim 1 in oral dosage form wherein the pharmaceutically active compound is phenolphthaline.
8. The composition of claim 1 in vaginal gel dosage form wherein the pharmaceutically active compound is nonylphenoxypolyethoxyethanol.
9. The composion of claim 1 in nasal dosage form wherein the pharmaceutically active compound is phenylephrine.

References Cited

UNITED STATES PATENTS

| 2,887,435 | 5/1959 | Witty et al. | 167—58 |
| 3,016,334 | 1/1962 | Lewis | 167—91 |
| 3,073,702 | 1/1963 | Keil et al. | 99—169 |
| 3,114,593 | 12/1963 | Griset et al. | 18—54 |
| 3,123,482 | 3/1964 | Lieberman | 99—176 |
| 3,156,620 | 11/1964 | Sharpless | 167—78 |
| 3,239,420 | 3/1966 | Gonshery et al. | 167—83 |
| 3,322,632 | 5/1967 | Schwick et al. | 167—78 |

FOREIGN PATENTS

| 671,356 | 2/1966 | Belgium. |
| 1,411,478 | 9/1965 | France. |

OTHER REFERENCES

Chem. Abstracts 65 (7), p. 10473e, Sept. 26, 1966.
Chem. Abstracts 64 (4), p. 4861c, Feb. 14, 1966.

LEWIS GOTTS, Primary Examiner.

S. K. ROSE, Assistant Examiner.

U.S. Cl. X.R.

424—359, 317, 341, 330